United States Patent
Jalan et al.

(10) Patent No.: US 9,630,526 B2
(45) Date of Patent: Apr. 25, 2017

(54) DRIVERS SEAT MOUNTING ASSEMBLY

(71) Applicant: International Truck Intellectual Property Company, LLC, Lisle, IL (US)

(72) Inventors: Mahesh Jalan, Naperville, IL (US); Robert Portney, Naperville, IL (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 0 days.

(21) Appl. No.: 14/784,724

(22) PCT Filed: Apr. 17, 2013

(86) PCT No.: PCT/US2013/036937
§ 371 (c)(1),
(2) Date: Oct. 15, 2015

(87) PCT Pub. No.: WO2014/171933
PCT Pub. Date: Oct. 23, 2014

(65) Prior Publication Data
US 2016/0059736 A1 Mar. 3, 2016

(51) Int. Cl.
*B60N 2/00* (2006.01)
*B60N 2/015* (2006.01)
*B60N 2/24* (2006.01)
*B60N 2/50* (2006.01)
*B62D 65/14* (2006.01)

(52) U.S. Cl.
CPC ............... *B60N 2/015* (2013.01); *B60N 2/24* (2013.01); *B60N 2/242* (2013.01); *B60N 2/50* (2013.01); *B62D 65/14* (2013.01)

(58) Field of Classification Search
CPC .......... B60N 2/015; B60N 2/24; B60N 2/242; B60N 2/50; B62D 65/14
See application file for complete search history.

(56) References Cited

U.S. PATENT DOCUMENTS 6,502,887 B1   1/2003   Lansinger

OTHER PUBLICATIONS

PCT search report from corresponding parent application, PCT/US2013/036937.
PCT International Preliminary Report on Patentability from corresponding parent application, PCT/US2013/036937.

*Primary Examiner* — Lori L Lyjak
(74) *Attorney, Agent, or Firm* — Jeffrey P. Calfa; Mark C. Bach

(57) ABSTRACT

A driver's seat mounting assembly for a vehicle includes a driver's seat having a base with a base hole, and a floor assembly including a floor sheet supported by a floor support frame. The floor support and the floor sheet define a receiving channel. The assembly further includes a riser platform attached to a top surface of the floor sheet, the riser platform having a platform body configured to receive the driver's seat. The platform body defines a body hole that is configured to be aligned with the receiving channel and the base hole. A sleeve is disposed in the receiving channel of the floor support frame. A fastener is received in the base hole, in the body hole, in the receiving channel, and in the sleeve to anchor the driver's seat to the floor support frame.

13 Claims, 5 Drawing Sheets

DRIVERS SEAT MOUNTING ASSEMBLY

BACKGROUND

Embodiments described herein relate generally to mounting a driver's seat in a vehicle, and more particularly, to mounting a driver's seat on a riser platform in a vehicle.

A driver's seat of a bus is typically mounted on a riser platform. Referring to FIGS. 1-4, the prior art driver's seat 1 is mounted on top of a riser platform 2. The riser platform 2 is MIG (metal inert gas) welded to a floor assembly 3 that includes a floor sheet 4 and a floor support frame 5. In the prior art, the riser platform 2 is MIG welded to the floor sheet 4. The floor sheet 4 is MIG welded to the floor support frame 5. There are four weld nuts (not shown) located underneath the riser platform 2, which are used to mount the driver's seat 1 on top of the riser platform.

When the prior art driver's seat 1 is mounted to the riser platform 2, the pull loading from a seat belt (not shown) associated with the driver's seat is transferred to the riser platform. The riser platform 2 is about 0.18-inches thick and is MIG welded at the interface of the riser platform with the floor sheet 4. The MIG welding and the weight of the riser platform 2 may cause the floor sheet to become warped.

In the prior art, there are different configurations of floor support frames and corresponding riser platforms for different types of buses and driver's seats used.

SUMMARY

A driver's seat mounting assembly for a vehicle includes a driver's seat having a base with a base hole, and a floor assembly including a floor sheet supported by a floor support frame. The floor support and the floor sheet define a receiving channel. The assembly further includes a riser platform attached to a top surface of the floor sheet, the riser platform having a platform body configured to receive the driver's seat. The platform body defines a body hole that is configured to be aligned with the receiving channel and the base hole. A sleeve is disposed in the receiving channel of the floor support frame. A fastener is received in the base hole, in the body hole, in the receiving channel, and in the sleeve to anchor the driver's seat to the floor support frame.

Another driver's seat mounting assembly for a vehicle includes a driver's seat having a base, the base having multiple base holes, and a floor support frame including a plurality of frame members. The frame members define multiple receiving channels from a bottom surface to a top surface of the floor support frame. A riser platform is coupled to the floor support frame. The riser platform has a platform body that is configured to receive the driver's seat. The platform body defines multiple body holes that are configured to be aligned with the multiple receiving channels and the multiple base holes. A sleeve is disposed in each of the receiving channels of the floor support frame. A fastener is received in at least one of the multiple base holes, in at least one of the multiple body holes, in at least one of the multiple receiving channels, and in at least one of the multiple sleeves to anchor the driver's seat to the floor support frame.

A method of mounting a vehicle seat having a seat belt to a floor assembly of a vehicle includes the steps of providing a floor assembly having a floor sheet supported by a floor support frame, the support frame having receiving channels disposed therethrough, the receiving channels each having a threaded sleeve, and locating a riser platform on a top surface of the floor sheet, the platform having body holes disposed therethrough. The method further includes the steps of supporting a driver's seat having base holes on the riser platform, aligning the base holes with the body holes and with the receiving channels, and inserting a fastener through the base holes, the body holes, the receiving channels and into the threaded sleeve.

DETAILED DESCRIPTION

Figure 1:
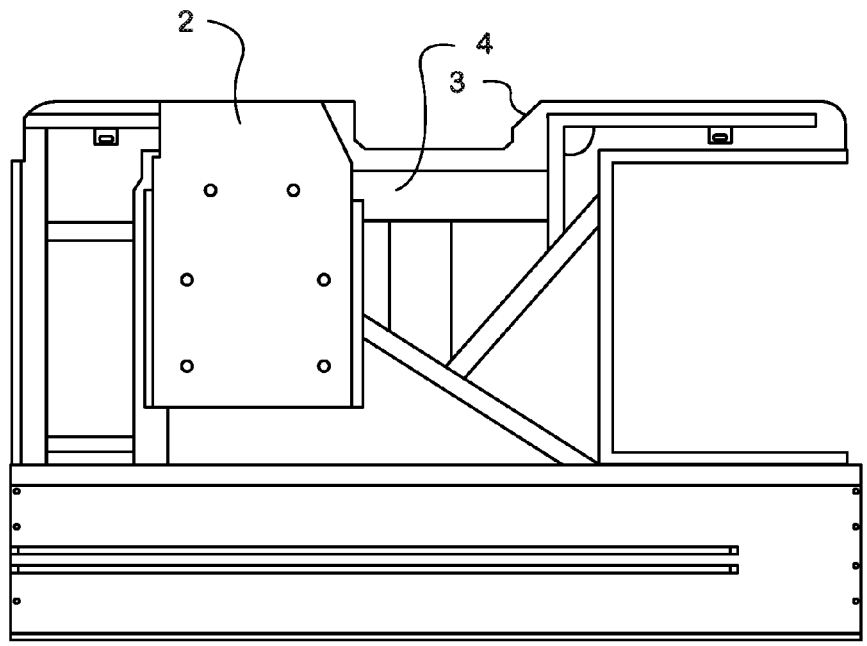
FIG. 1 is a top plan view of a prior art riser platform mounted on a floor assembly.
Figure 2:
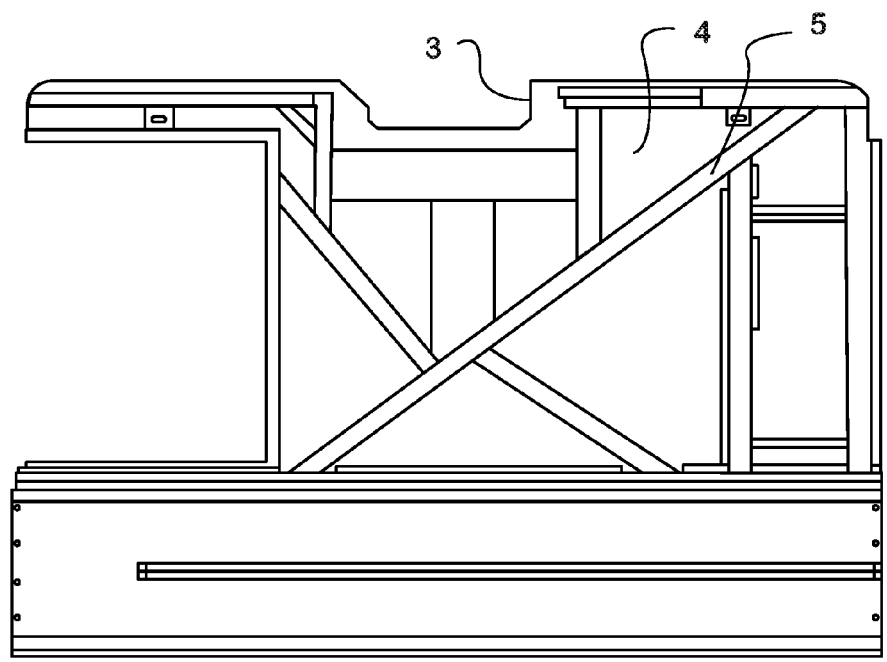
FIG. 2 is a bottom plan view of the prior art floor assembly including a floor sheet and a floor support frame.
Figure 3:
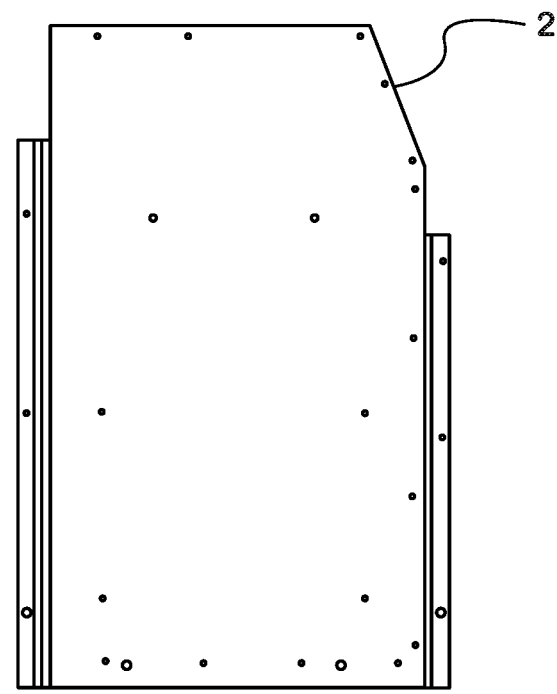
FIG. 3 is a top plan view of the prior art riser platform.
Figure 4:
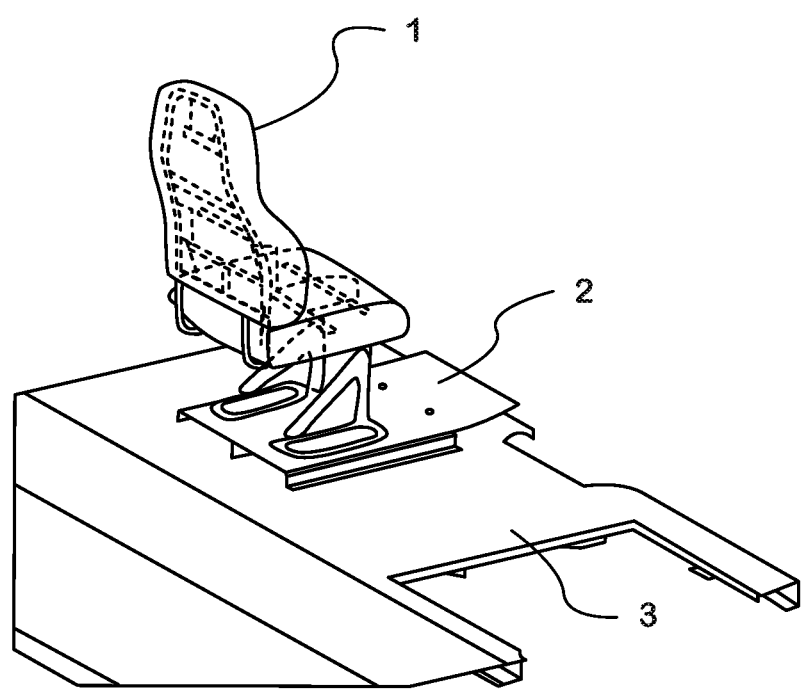
FIG. 4 is a rear perspective view of a driver's seat attached to the prior art riser platform mounted on the floor assembly.
Figure 5:
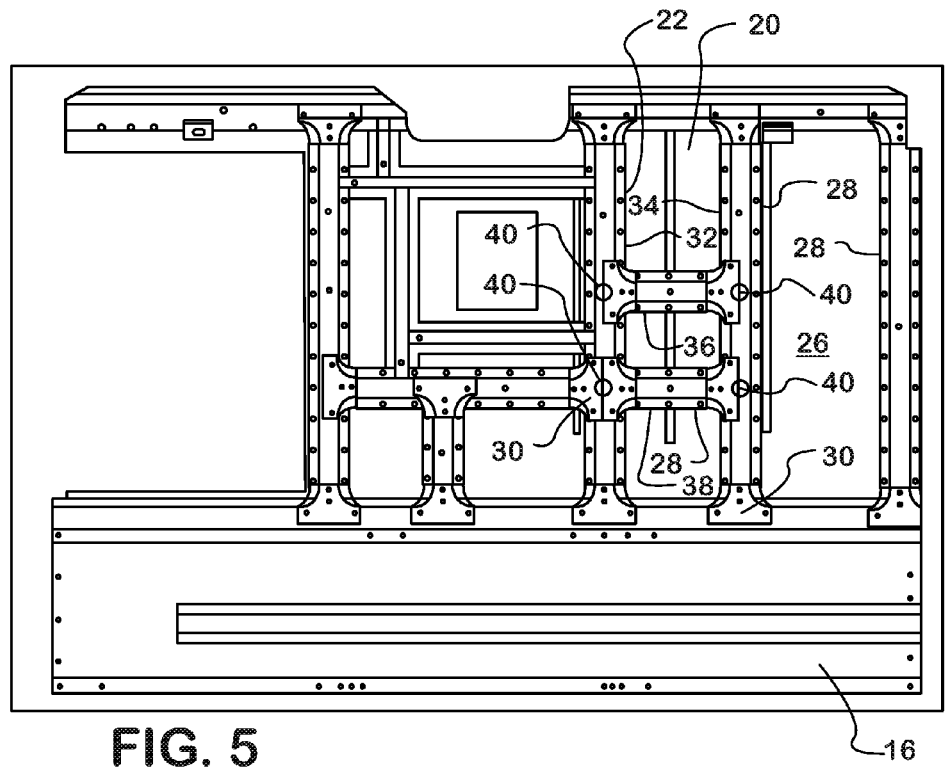
FIG. 5 is a bottom plan view of a floor assembly including a floor sheet and a floor support frame.
Figure 6:
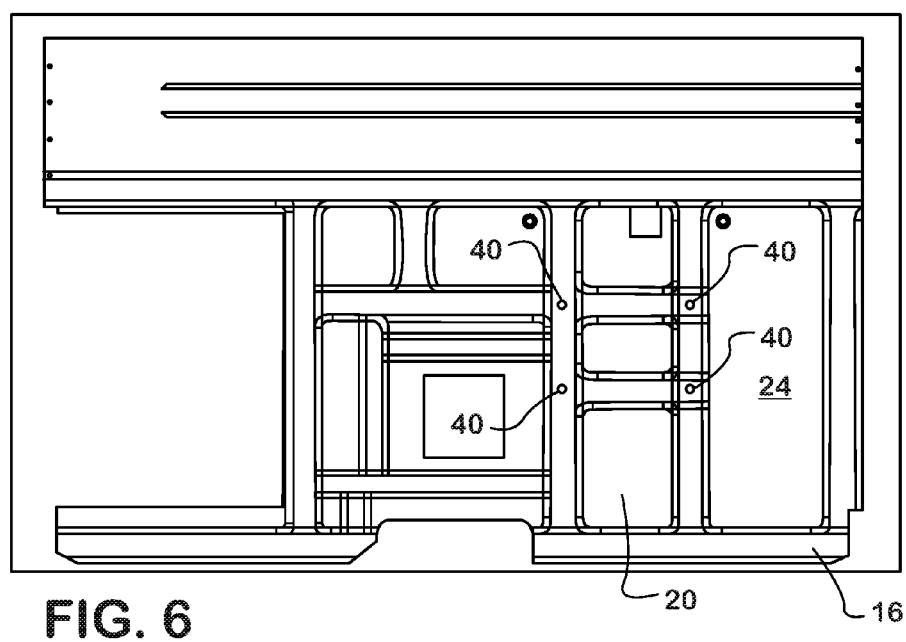
FIG. 6 is a top plan view of the floor assembly.

Referring to FIGS. 5-9, a driver's seat mounting assembly is indicated generally at 10, and includes a driver's seat 12 mounted on a riser platform 14 and on a floor assembly 16 of a vehicle 18. While the driver's seat mounting assembly 10 will be explained with reference to use with bus, it should be appreciated that the driver's seat mounting assembly 10 can be used in any vehicle application, for example a truck or van.

The floor assembly 16 includes a generally planar floor sheet 20 that is supported by a floor support frame 22. The floor sheet 20 has an upper surface 24 that engages the riser platform 14, and a lower surface 26 that engages the floor support frame 22. Multiple frame members 28 are joined together to form the floor support frame 22. Reinforcement members 30 may be used at the joints of the frame members 28. In the driver's seat mounting assembly 10, the floor support frame 22 is spot-welded to the floor sheet 20, which may reduce stress and warping of the floor sheet as compared to conventional MIG welding.

In the floor assembly 16, there is a first longitudinal frame member 32 and a second longitudinal frame member 34 that are generally parallel to each other, and a first lateral frame member 36 and a second lateral frame member 38 that are generally parallel to each other. The longitudinal frame members 32 and 34 may be generally parallel with a longitudinal axis A of the riser platform 14. The lateral frame members 36, 38 may extend generally perpendicularly between the longitudinal frame members 32, 34. It is contemplated that the floor support frame 22 can have other configurations.

At each junction of the lateral frame members 36, 38 with the longitudinal frame members 32, 34, there is a receiving channel 40 having a threaded sleeve 46. It is possible that the threaded sleeve 46 is a separate component that is inserted into the receiving channel 40, or that the sleeve is not a separate component but is integrally formed into the frame member 28 as the receiving channel. It is possible that the frame members 28 are solid members, C-shaped, L-shaped, I-shaped or any other shape. The receiving channel 40 extends through a bottom surface 42 of the support frame 22 to a top surface 44 of the support frame. The receiving channel 40 also extends through the floor assembly 16 from the lower surface 26 of the floor sheet 20 to an upper surface 24 of the floor sheet. Together, the floor sheet 20 and the floor support frame 22 define the receiving channel 40. In the floor assembly 16, the threaded sleeve 46 may not extend through the floor sheet 20. The sleeve 46 may be inserted from the bottom surface 42 of the floor support frame 22 and may protrude from the bottom surface.

Figure 7:
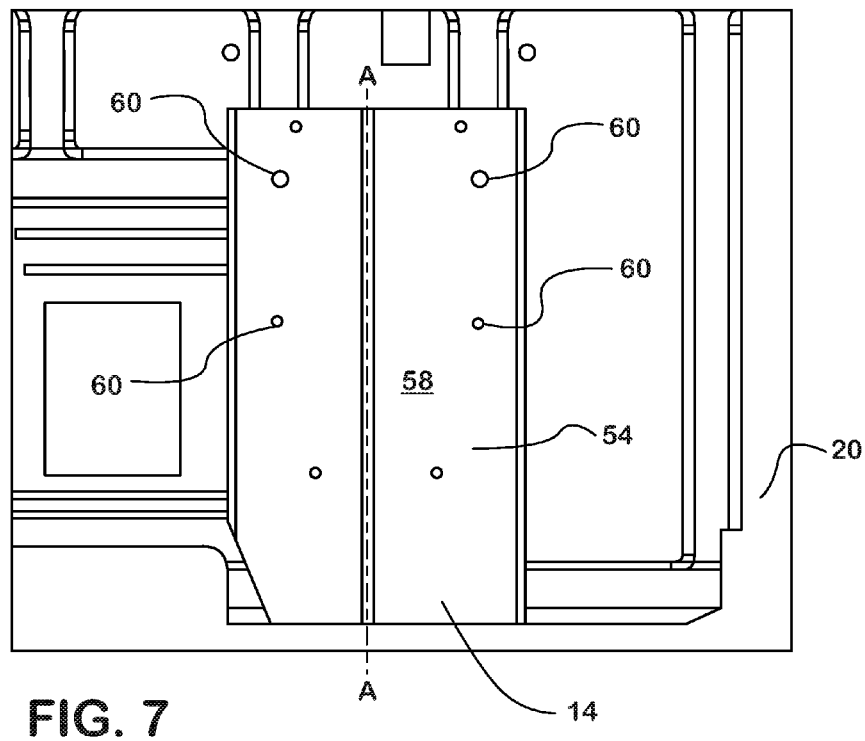
FIG. 7 is top plan view of a riser platform located on the floor assembly.
Figure 8:
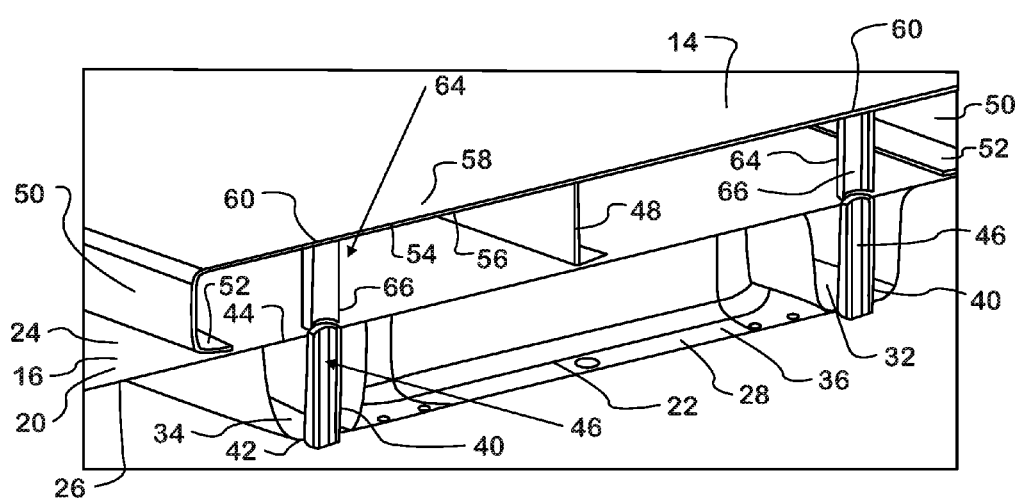
FIG. 8 is a cross-section view of the riser platform located on the floor assembly.
Figure 9:
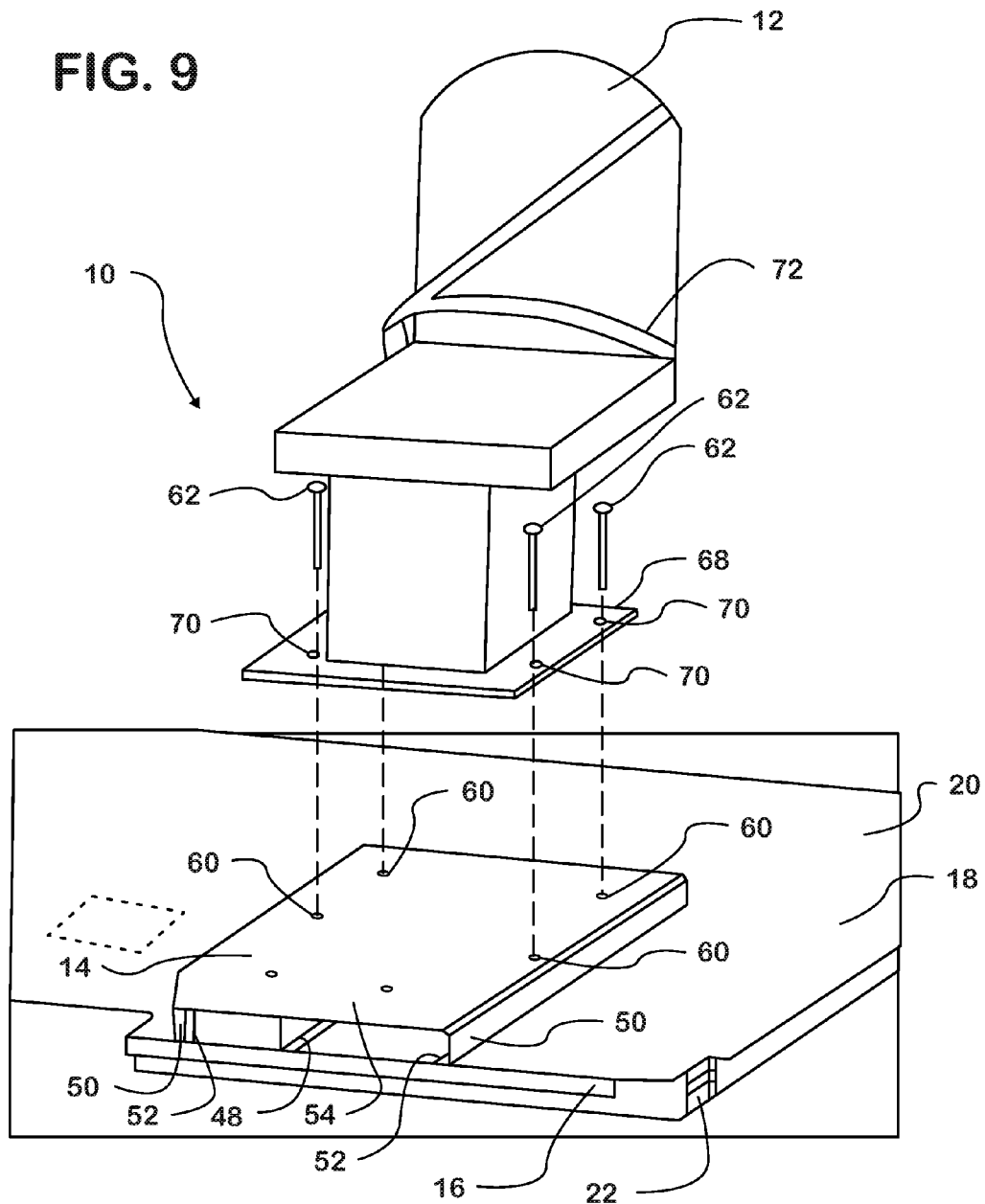
FIG. 9 is an exploded perspective view of a driver's seat mounting assembly including the driver's seat mounted on the riser platform mounted on the floor assembly.

The riser platform 14 engages the upper surface 24 of the floor sheet 20, and may be oriented such that the longitudinal axis A of the riser platform is generally parallel with the longitudinal frame members 36, 38. Referring to FIGS. 7-9, the riser platform 14 may be generally rectangular in shape, however other shapes are contemplated. Two exterior legs 50 may run substantially the length of the riser platform 14 and may include inwardly extending lips 52 that engage the upper surface 24 of the floor sheet 20. It is possible that the legs 50 do not extend the length of riser platform 14 or that the legs 50 comprise multiple legs along the length of the riser platform. The legs 50 extend from a generally planar platform body 54. A center support 48 may extend from a bottom surface 56 of support the body 54 at a location between the exterior legs 50. The center support 48 may engage the upper surface 24 of the floor sheet 20. Opposite of the bottom surface 56 of the platform body 54 is a top surface 58 of the platform body which receives the driver's seat 12. The platform body 54 may have a thickness of about 0.074-inches (about 14 gauge), although other thicknesses are contemplated.

The platform body 54 includes a plurality of body holes 60 that extend from the bottom surface 56 to the top surface 58. When the riser platform 14 is engaged on the floor sheet 20, the body holes 60 are configured to be aligned with the receiving channels 40 of the floor assembly 16. In the driver's seat mounting assembly 10, there are four body holes 60 that are configured to be aligned with four receiving channels 40 at the junctions of the lateral frame members 36, 38 and the longitudinal frame members 32, 34.

To assemble the driver's seat mounting assembly 10, the riser platform 14 is located on the upper surface 24 of the floor sheet 20 and aligned with respect to the floor support frame 22 by aligning the body holes 60 with the receiving channels 40. A fastener 62 may be inserted into the body holes and the receiving channels 40 to maintain alignment. Crush tubes 64 may be located at each body hole 60 between the platform body 54 and the floor sheet 20. The crush tube 64 is a generally elongate tube member that receives the fastener 62 and forms an extended receiving channel 66 with the body hole 60, the receiving channel 40 and the sleeve 46. The crush tube 64 may guide the fastener 62 into the receiving channel 40. It is possible that the crush tube 64 may be integrally formed with the riser platform 14 or may be a separate component.

While the riser platform 14 is aligned with the floor assembly 16, the riser platform may be MIG welded at select locations, for example at the corners of the riser platform. Reducing the amount of MIG welds to only select locations around the riser platform 14 may result in less floor sheet warping. After welding, the fasteners 62 can be removed from the body holes 60 and the driver's seat 12 can be located on the riser platform 14.

Alternately, if there is no MIG welding of the riser platform 14 to the floor assembly 16, when the riser platform 14 is located on the upper surface 24 of the floor sheet 20 by aligning the body holes 60 with the receiving channels 40, the driver's seat 12 can be located on the riser platform 14 without using the fasteners to maintain alignment.

The driver's seat 12 includes a base 68 having base holes 70 that are configured to be aligned with the body holes 60 and the receiving channels 40 of the floor support frame 22. Once aligned, the threaded fastener 62 can be inserted into the base hole 70, through the body hole 60, through the crush tube 64, through the receiving channel 40, and into the threaded sleeve 46. Receiving the threaded fastener 62 into the threaded sleeve 46 secures the driver's seat 12 to the floor support frame 22. The loading of the driver's seat 12 is translated to the floor support frame 22. Likewise, the pull loading of a seat belt 72 associated with the driver's seat 12 is transferred to the floor support frame 22. The sleeve 46 anchors the driver's seat 12 and the associate seat belt 72 to the floor support frame 22.

It is contemplated that the driver's seat mounting assembly 10 can be used with different configurations of driver's seats 12, riser platforms 14 and floor support frames 22 to transfer the loading of the seat belt 72 to the floor support frame. It is possible that multiple base holes, multiple body holes, multiple receiving channels, and multiple sleeves may be provided to accommodate different configurations of driver's seats 12 and floor support frames 22 such that all base holes, body holes, receiving channels, sleeves may not be in use depending on the particular application.

The riser platform 14 may be formed of steel or aluminum, however other materials are possible. The threaded sleeves 41 may be a solid rod that is machined out and threaded, and then attached to the frame members 28, however other configurations are possible. Alternately, the threaded sleeve may be machined out from the frame member 28 directly. The sleeves 41 may have varying sizes, for example two sleeves may have 5/16-18 UNC (unified coarse thread), and two sleeves may have 1/2-13 UNC. The riser platform 14 is thinner and more portable than the prior art, with a reduction in thickness from about 0.18-inches to about 0.074-inches, which results in weight reduction and lower material costs. The weight of the floor assembly 16 is reduced from about 292-pounds to 244-pounds as compared with the prior art.

The driver's seat mounting assembly 10 accommodates different driver's seats 12, riser platforms 14 and floor support frames 22. With the driver's seat mounting assembly 10, the pull load of the seat belt 72 is transferred to the floor support frame 22, and bypasses the riser platform 14. Further, assembly of the driver's seat 12 onto the riser platform 14 and the floor assembly 16 is from the top of the seat base 68, and can be accomplished by a single person. The riser platform 14 is coupled to the floor sheet 20 through the attachment of the driver's seat 12 to the floor support frame 22, with minimal to no MIG welds being used.

What is claimed is:

1. A driver's seat mounting assembly for a vehicle comprising:
    a driver's seat having a base, the base having at least one base hole;
    a floor assembly including a floor sheet supported by a floor support frame, the floor support and the floor sheet defining at least one receiving channel;
    a riser platform attached to a top surface of the floor sheet, the riser platform having a platform body configured to receive the driver's seat, the platform body defining at least one body hole that is configured to be aligned with the at least one receiving channel and the at least one base hole;

at least one sleeve disposed in the receiving channel of the floor support frame;

at least one fastener received in the at least one base hole, in the at least one body hole, in the at least one receiving channel, and in the at least one sleeve to anchor the driver's seat to the floor support frame; and at least one crush tube extending from the platform body to the floor sheet, the crush tube defining an extended receiving channel with the body hole, the receiving channel and the sleeve.

2. The driver's seat mounting assembly of claim 1 wherein the at least one base hole comprises four base holes, wherein the at least one receiving channel comprises four receiving channels, wherein the at least one body hole comprises four body holes, wherein the at least one sleeve comprises four sleeves, and wherein the at least one fastener comprises four fasteners.

3. The driver's seat mounting assembly of claim 1 wherein the riser platform is welded to the floor sheet.

4. The driver's seat mounting assembly of claim 1 wherein the floor support frame further comprises a first longitudinal frame member and a second longitudinal frame member that are generally parallel to each other, and a first lateral frame member and a second lateral frame member that are generally parallel to each other, wherein the at least one receiving channel comprises multiple receiving channels, wherein each of the multiple receiving channels are disposed through one of the longitudinal frame members and the lateral frame members.

5. The driver's seat mounting assembly of claim 1 further comprising a seat belt disposed on the driver's seat, wherein the seat belt is coupled to the floor support frame through the engagement of the at least one fastener with the at least one sleeve.

6. A driver's seat mounting assembly for a vehicle comprising:
   a driver's seat having a base, the base having multiple base holes;
   a floor support frame including a plurality of frame members, the frame members defining multiple receiving channels from a bottom surface to a top surface of the floor support frame;
   a riser platform coupled to the floor support frame, the riser platform having a platform body configured to receive the driver's seat, the platform body defining multiple body holes that are configured to be aligned with the multiple receiving channels and the multiple base holes;
   a threaded sleeve disposed in each of the receiving channels of the floor support frame; and
   a fastener received in at least one of the multiple base holes, in at least one of the multiple body holes, in at least one of the multiple receiving channels, and in at least one of the multiple sleeves to anchor the driver's seat to the floor support frame.

7. The driver's seat mounting assembly of claim 6 wherein the floor support frame includes a first longitudinal frame member and a second longitudinal frame member that are generally parallel to each other, and a first lateral frame member and a second lateral frame member that are generally parallel to each other, wherein each of the multiple receiving channels are disposed through one of the longitudinal frame members and the lateral frame members.

8. The driver's seat mounting assembly of claim 6 wherein the floor support frame includes a first longitudinal frame member and a second longitudinal frame member that generally parallel to a longitudinal axis of the riser platform, and a first lateral frame member and a second lateral frame member that extend between the first longitudinal frame member and the second longitudinal frame member, wherein each of the multiple receiving channels are disposed through one of the longitudinal frame members and the lateral frame members generally at the junctions of the longitudinal frame members with the lateral frame members.

9. The driver's seat mounting assembly of claim 6 further comprising a floor sheet attached to the floor support frame, wherein the riser platform is mounted on an upper surface of the floor sheet.

10. The driver's seat mounting assembly of claim 6 further comprising a seat belt disposed on the driver's seat, wherein the seat belt is coupled to the floor support frame through the engagement of the fastener with the sleeve.

11. A method of mounting a driver's seat having a seat belt to a floor assembly of a vehicle comprising:
   providing a floor assembly having a floor sheet supported by a floor support frame, the support frame having receiving channels disposed therethrough, the receiving channels each having a threaded sleeve;
   locating a riser platform on a top surface of the floor sheet, the platform having body holes disposed therethrough;
   supporting the driver's seat having base holes on the riser platform;
   aligning the base holes with the body holes and with the receiving channels;
   inserting a fastener through the base holes, the body holes, the receiving channels and into the threaded sleeve; and
   inserting the fastener through the body holes, through crush tubes extending between the riser platform and the floor assembly, and through the receiving channels.

12. The method of claim 11 further comprising the step of welding the platform riser to the floor sheet.

13. The method of claim 11 further comprising the step of inserting the fasteners into the body holes and the receiving channels for maintaining alignment the riser platform with the floor assembly, and the step of removing the fasteners from the body holes and the receiving channels before the step of supporting the driver's seat on the riser platform.

* * * * *